(12) United States Patent
Bélanger

(10) Patent No.: US 9,149,879 B2
(45) Date of Patent: Oct. 6, 2015

(54) GUIDE CUTTING TOOL AND SPACER FOR USE IN CUTTING METAL STUDS

(76) Inventor: Ghislain Bélanger, Rivière des Prairies (CA)

(*) Notice: Subject to any disclaimer, the term of this patent is extended or adjusted under 35 U.S.C. 154(b) by 249 days.

(21) Appl. No.: 13/619,378

(22) Filed: Sep. 14, 2012

(65) Prior Publication Data

US 2013/0067980 A1    Mar. 21, 2013

Related U.S. Application Data

(60) Provisional application No. 61/573,154, filed on Sep. 16, 2011.

(51) Int. Cl.
| | |
|---|---|
| *B23D 33/12* | (2006.01) |
| *E04C 3/40* | (2006.01) |
| *B23D 29/00* | (2006.01) |
| *B23D 23/00* | (2006.01) |
| *B23D 29/02* | (2006.01) |

(52) U.S. Cl.
CPC . *B23D 33/12* (2013.01); *E04C 3/40* (2013.01); *B23D 23/00* (2013.01); *B23D 29/00* (2013.01); *B23D 29/02* (2013.01)

(58) Field of Classification Search
CPC ........ B23D 33/12; B23D 23/00; B23D 29/00; B21D 43/28; B21D 33/12; B21D 35/00; B21D 5/00; B21D 11/20; B21D 28/10; B21D 28/28; E04B 2/7457; E04B 2/7411; B23B 47/28; B25H 7/04
USPC ............ 52/317, 696, 324, 37, 712, 846, 657, 52/384; 83/324, 13, 34, 54, 821, 861, 917, 83/468, 468.1, 468.2, 468.6, 451, 523, 83/375, 467, 580, 682, 453, 178, 179, 180, 83/181, 182, 183, 184, 185, 186, 187, 188, 83/189, 190, 191, 192, 193, 194
See application file for complete search history.

(56) References Cited

U.S. PATENT DOCUMENTS

| | | | | |
|---|---|---|---|---|
| 4,372,050 | A * | 2/1983 | Eisenhauer | 33/528 |
| 4,538,354 | A * | 9/1985 | Smolik | 408/72 B |
| 4,875,274 | A * | 10/1989 | Foster | 29/897.3 |
| 2004/0172912 | A1* | 9/2004 | Brunt | 52/698 |
| 2013/0240491 | A1* | 9/2013 | Goodman, Jr. | 219/121.44 |

* cited by examiner

*Primary Examiner* — Peter DungBa Vo
*Assistant Examiner* — John S Lowe
(74) *Attorney, Agent, or Firm* — Equinox IP; Franz Bonsang

(57) ABSTRACT

A guide cutting tool for use in cutting metal studs used in wall construction includes a plate having generally opposite notches. Each notch has a straight notch guide wall extending generally inwardly towards the corresponding straight notch guide wall of the opposite notch at a generally perpendicular orientation from a corresponding side of the plate, with the two straight notch guide walls being generally collinear with one another. A spacer, for use in cutting metal studs, is formed with a guide cutting tool located at each longitudinal end of a connector member.

5 Claims, 2 Drawing Sheets

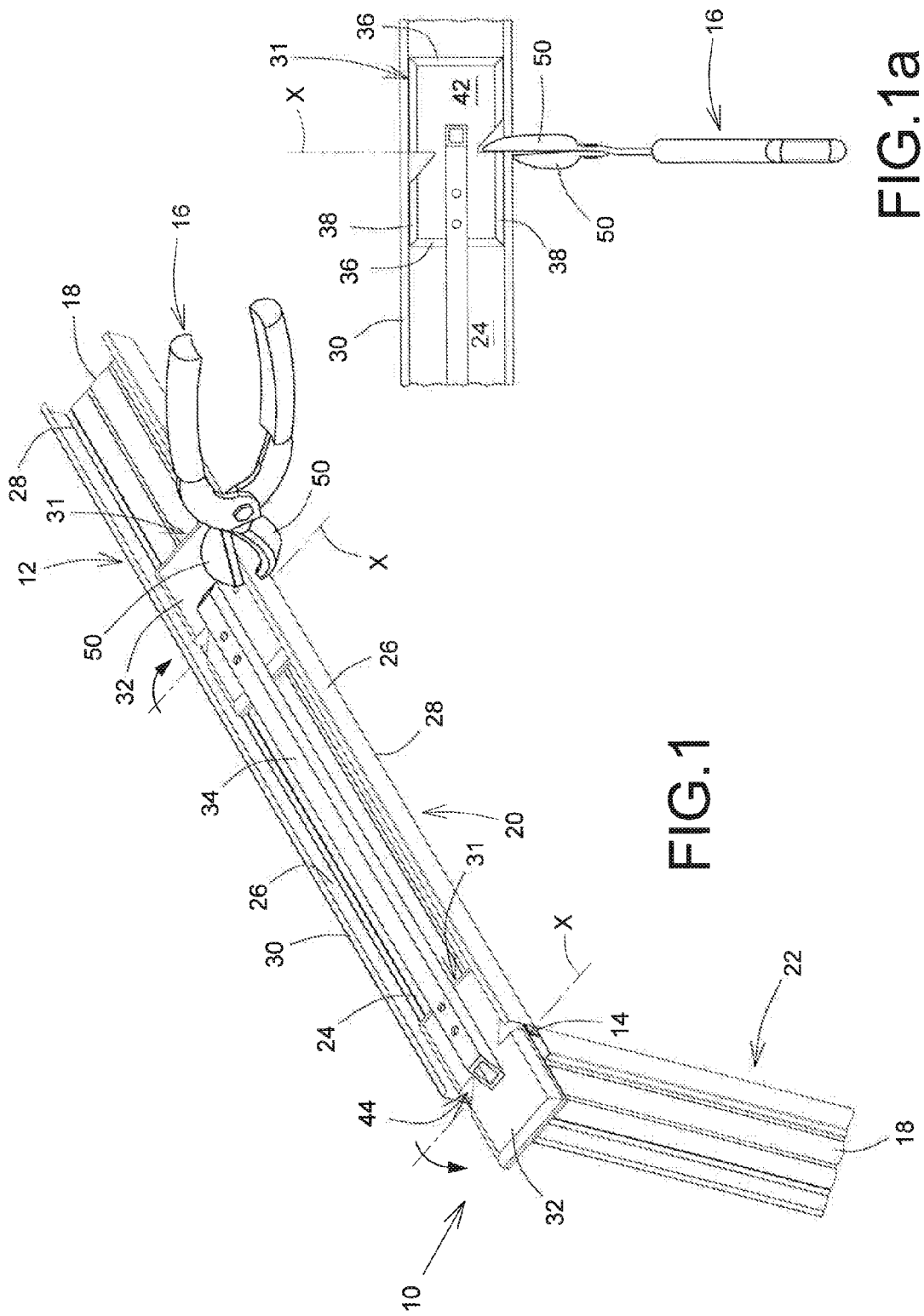

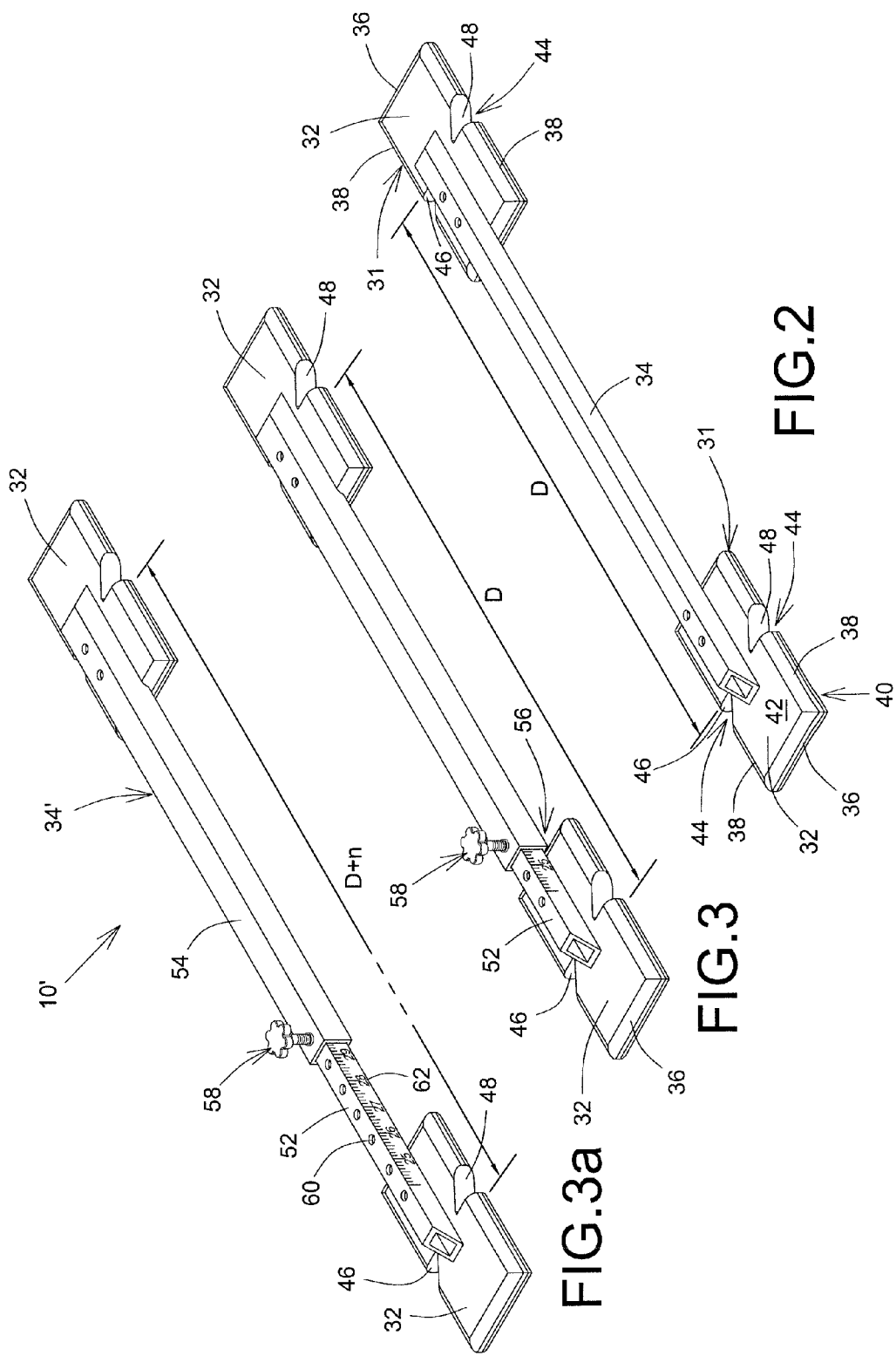

GUIDE CUTTING TOOL AND SPACER FOR USE IN CUTTING METAL STUDS

CROSS-REFERENCE TO RELATED APPLICATION

This application claims the benefits of U.S. provisional application for patent No. 61/573,154 filed on Sep. 16, 2011, which is herein incorporated by reference.

FIELD OF THE INVENTION

The present invention relates to wall construction, and in particular to a guide cutting tool and a spacer for use in cutting metal studs used in wall construction.

BACKGROUND OF THE INVENTION

Use of U-shaped metal studs, such as those discussed in U.S. Pat. No. 6,705,056, for forming walls and frames for doorways in such walls are well known in the art. As is known in the art, such studs usually consist of a rear stud wall with first and second side stud walls extending substantially perpendicularly in a common direction from the rear stud wall along the length thereof with first and second stud flanges extending substantially perpendicularly inwardly from, respectively, the first and second side stud walls towards one another along the length of the side stud walls.

Typically, when using metal studs to connect other support structures, for example side support studs, at a predetermined distance from one another, an intermediate stud, generally defining the distance between the other support structures is connected therebetween. For example, to form a doorway frame with metal studs an intermediate stud, having the desired top width of the doorway frame is connected to first and second side metal studs, which define the vertical sides of the doorway frame. Specifically, a first crease or hinge is formed in the rear stud wall proximal a first longitudinal stud end of the intermediate stud by cutting inwardly through the first and second side stud walls and flanges to the rear stud wall, thus forming respective creases ends for a first crease extending perpendicular to the opposed lateral rear stud wall ends of the rear stud wall, i.e. the intersection between the side stud walls and the rear stud wall. A second crease or hinge is formed, at a predefined distance from the first crease, in the rear stud wall proximal a second longitudinal stud end of the intermediate stud in similar fashion. Thus an intermediate portion of the intermediate stud is formed between the creases, with first and second end portions extending from the creases to, respectively, the first and second stud ends. The predefined distance or length between the creases for the intermediate portion corresponds to the desired top width of the door frame extending between the side support studs. The end portions are then folded downwards and connected to the ends of the first and second side studs, for example by wedged insertion therein, to form the door frame.

Unfortunately, it is not uncommon, when cutting the intermediate stud to form the creases, to cut one or the other creases at an incorrect position. In such cases, the length of the intermediate portion defining the top width of the door frame between the vertical side support studs is incorrect. Further, it is quite common that, in cutting one or the other of the creases, when the first and second side stud walls and flanges are cut to form the creases, that the crease is not formed perpendicular to the rear wall ends. In such case, the crease is crooked which makes attachment to the side support studs cumbersome. Typically, when such errors occur, it is necessary to discard the intermediate stud and to cut the creases again in a new stud, which wastes time, money, and material.

Accordingly, there is a need for a guide cutting tool for a spacer for use in cutting metal studs.

SUMMARY OF THE INVENTION

It is therefore a general object of the present invention to provide a guide cutting tool for a spacer, and method therefore, for use in cutting metal studs.

An advantage of the spacer provided by the present invention is that the spacer ensures correct spacing of cuts in the stud to form creases at a desired predetermined distance from one another.

Another advantage of the present invention is that each guide cutting tool ensures that the creases are at right angles to the lateral rear wall ends of the rear stud wall, thus ensuring that the creases are foldable along a straight line perpendicular the lateral rear wall ends.

Still another advantage of the present invention is that the guide cutting tool, and the spacer, is easy to use and of simple configuration.

According to an aspect of the present invention, there is provided a guide cutting tool for use in cutting a metal stud to form a crease for defining a bendable end portion extending from the crease to first longitudinal stud end of the stud and bendable along the crease, the metal stud having a rear stud wall, first and second side stud walls connected longitudinally to the rear stud wall at opposed lateral rear wall ends and extending substantially perpendicularly to the rear stud wall, and stud flanges extending substantially perpendicularly inwardly from each side stud wall towards one another, the tool comprising:

a plate having first and second longitudinal plate ends and generally opposed plate sides extending longitudinally between the plates ends, the plate being sized and shaped for sliding insertion into the stud with the plate resting on the bottom wall and the plate sides resting snugly against the first and second side stud walls, each plate side having notches formed therein with each notch having a straight notch guide wall extending inwardly at a generally perpendicular orientation from the plate side and a remaining notch wall extending inwardly from the plate side towards the notch guide wall, the notch guide walls of each plate side being colinearly aligned and the remaining notch walls extending inwardly towards opposite plate ends of the plate, the notch guide walls bracing a blade of a cutting implement in abutment along the guide wall during cutting through the first and second side stud walls and the flanges down to the rear stud wall with implement to form the crease, the collinear alignment of the notch guide walls and the perpendicular orientation of the guide walls ensuring that the crease extends perpendicular the lateral rear wall ends.

According to another aspect of the present invention, there is provided a spacer for use in cutting a metal stud to form first and second creases for defining an intermediate portion of predetermined length between the creases and bendable end portions extending from the creases to first and second longitudinal stud ends of the stud and bendable along the creases for attachment of the metal stud on end portions to supporting structures at desired angles, the metal stud having, extending from the first to second stud end, a rear stud wall, first and second side stud walls connected longitudinally to the rear stud wall at opposed lateral rear wall ends and extending substantially perpendicularly to the rear stud wall, and stud flanges extending substantially perpendicularly inwardly from each side stud wall towards one another, the spacer comprising:

first and second plates, each said plate having first and second longitudinal plate ends and generally opposed plate sides extending longitudinally between the plates ends, the plates being sized and shaped for sliding insertion into the stud with the plates resting on the bottom wall and the plate sides resting snugly against the first and second side stud walls, each plate side having, preferably triangular, notches formed therein with each notch having a straight notch guide wall extending inwardly at a generally perpendicular orientation from the plate side and a slanted remaining notch wall extending inwardly from the plate side towards the notch guide wall, the notch guide walls of each plate side being colinearly aligned and the slanted notch walls extending, or slanting, inwardly towards opposite plate ends of the plate;

a connector member connecting the plates with the first and second side stud walls of each plate in collinear alignment with one another and the straight notch walls of the first plate spaced apart at the predetermined length from the straight notch walls of the second plate, the notch guide walls bracing a blade of a cutting implement in abutment along the guide wall during cutting through the first and second side stud walls and the flanges down to the rear stud wall with implement to form the creases, the collinear alignment of the notch guide walls and the perpendicular orientation of the guide walls ensuring that the creases extend perpendicular the lateral rear wall ends and the predetermined length between the notch guide walls ensuring that the creases are spaced apart at the predetermined length and that the intermediate portion is of the predetermined length.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 1 is a top perspective view of a spacer, formed of two spaced apart guide cutting tools connected to each other, for use in cutting a metal stud in accordance with a first embodiment of the present invention, showing the spacer in use while cutting the stud;

FIG. 1a is partial top plan view of the spacer shown in FIG. 1;

FIG. 2 is top perspective view of the spacer shown in FIG. 1, illustrating spacing at a predetermined distance;

FIG. 3 is top perspective view of a second embodiment of a spacer for use in cutting a metal stud in accordance with the present invention, illustrating spacing at a predetermined distance; and FIG. 3a is top perspective view of the embodiment of FIG. 3, illustrating spacing at an adjusted predetermined distance.

DETAILED DESCRIPTION OF THE INVENTION

With reference to the annexed drawings the preferred embodiment of the present invention will be herein described for indicative purpose and by no means as of limitation.

Referring now to FIGS. 1, 1a, and 2, therein is shown a spacer, shown generally as 10, for use in cutting a metal stud 12 with a cutting tool 16, typically metal snips 16, to form at least one, and typically a first and a second, foldable crease 14 defining axes X at which the metal stud 12 may be folded. The stud 12 typically includes a rear stud wall 24, generally opposed first and second side stud walls 26 extending perpendicularly in a common direction from lateral rear wall ends 28 or intersections with the rear stud wall 24, and respective stud flanges 30, one on each side stud wall 26, extending generally perpendicularly towards one another. The flanges 30, side stud walls 26 and rear stud wall 24 extend from a first longitudinal stud end 18 to an opposite second longitudinal stud end 32. The first and second creases 14 are cut by cutting through first and second side stud walls 26 and flanges 30 to rear stud wall 24 proximal first and second stud ends 18. Thus, the creases 14 define an intermediate portion, shown generally as 20, of length D on the rear stud wall 24 extending therebetween and first and second end portions or tabs, shown generally as 22, extending from creases 14 to stud ends 18.

As explained above, the end portion 22 may then be folded on axis X defined by creases 14 in rear stud wall 24 to a desired angle, typically approximately 90 degrees, relative the intermediate portion 20 and attached to first and second supporting structures, not shown. Thus, the stud 12, and in particular the intermediate portion 20 connects the support structures at the predetermined distance D from one another. For example, the support structures could be additional, side metal studs, to which the end portions 22 are attached, for example by wedged insertion of the end portions 22 into the side metal studs, with the stud flanges 30 tightly engaged against similar flanges in the side metal studs to retain the stud 12 connected to the side metal studs. Thus, the side metal studs or support members could be connected by the metal stud 12 and spaced apart from one another at predetermined distance D to form, among other things, a frame for a doorway with the metal stud 12 defining the desired and predefined top width D of the doorway frame and the side support members forming the sides of the doorway frame.

The spacer 10 is deployed to ensure that the distance between the creases 14, i.e. the length of the intermediate portion, corresponds to the predetermined distance D and that the creases 14 extend perpendicularly to the lateral rear wall ends 28, thus forming a straight line across the rear stud wall 24. As shown, the spacer includes a pair of guide cutting tools 31, preferably first and second plates 32 connected by a connector rod or member, shown generally as 34. The plates 32, preferably rectangular in shape, have respective first and second longitudinally opposed plate ends 36 and generally opposed plate sides 38 extending longitudinally between the plates ends 36, and preferably generally perpendicular to the outermost first plate ends 36. Preferably, the plate sides 38 and plate ends 36 are, respectively, plate side walls 38 and end walls 36 which extend from a plate bottom surface 40 up to a plate top surface 42 spaced apart therefrom. The connecting member 34 connects the plates 32 on the top surface 42 and the bottom surface 40 is planar and flat for resting on the rear stud wall 24. More specifically, the plates 32 are configured, for example sized and shaped, for sliding insertion into the stud 12 at the stud ends 18 with the plates 32, notably bottom surface 40, resting on the rear stud wall 24 and the first and second plate sides 38 resting, at least at the bottom surface, snugly against the first and second stud side walls 26. If desired, the plate sides 38 may taper inwardly from the bottom surface 40 to the top surface 42.

As better seen in FIG. 2, and also FIGS 3 and 3a, the first and second plate sides 38 of each plate 32 have at least one pair of notches 44 formed therein, one notch 44 of each pair on each side 38. Each notch 44 has a straight notch guide wall 46 extending inwardly at a generally perpendicular angular orientation from the plate side 38, the straight notch guide walls 46 of each pair collinearly aligned with one another. Additionally, each notch 44 has a slanted notch wall 48 extending inwardly from the plate side 38 towards the notch guide wall 46, preferably at about 45 degrees, the slanted notch walls 48 of each pair slanting inwardly towards opposite plate ends 36 of the plate 32. The slanted notch walls 48 on the first plate side 38 of each plate 32 slant in the same first direction, whereas the slanted notch walls 48 on the second plate side 38 of each plate slant in the opposite, second direction. The notch walls 46, 48 of each notch 44 are formed at sufficient depth into the plate 32 and at sufficient distance from one another at the plate side 38 such that blades 50 of the cutting tool 16, and in particular of blades 50 of a metal snip 16, may fit comfortably within the notch 44 while cutting the flanges 30 and side stud walls 26 down to the rear stud wall 24 when the plates 32 and spacer 10 are placed within the stud 12. In particular, the notches 44 allow the cutting blades 50 to be positioned in guiding abutment along the notch guide wall 46 during cutting through the side stud walls 26 and the flanges 30 down to the rear stud wall 28 to form ends of the creases 14, subsequently formed by bending of rear stud wall 26 around axis X.

The connector member 34 connects the plates 32 with the first plate sides 38 in collinear alignment with one another and the second plate sides 38 in collinear alignment with one another, thus ensuring that the spacer 10 may be slid in the stud 12 on rear stud wall 24 with the plate sides 38 in sliding abutting contact with side stud walls 26. Further, the connector member 34 connects the plates 32 spaced apart from one another such that the notch guide walls 46 of the first plate 32 are spaced apart at the predetermined distance D from the notch guide walls 46 of the second plate 32.

Advantageously, as the notch guide walls 46 on each plate side 38 are spaced apart at the predetermined distance D, cutting the side stud walls 26 and flanges 30 with the blade 50 of the cutting tool 16 guidingly positioned against the notch guide walls 46 greatly facilitates making cuts in the first side stud walls 26 and flanges 22 at distance D from one another and cuts in the second side stud walls 26 and flanges 22 at distance D from one another. In fact, provided the cuts on each side stud wall 26 and respective flange 30 are aligned with the notch guide walls 46, the position of axes X and formation of creases 14 by folding on axes X at predetermined distance D from one another is ensured. Further, since the plate sides 46 are positioned in abutment with the side stud walls 26 and the notch guide walls 46 on each plate side 38 extend perpendicularly to the plate side 38 and in collinear alignment with one another, cutting with the blade 50 aligned against the guide walls 46 ensures that the axes X and creases 14 will extend generally perpendicular to the rear wall ends 28 and that the point of intersections of each crease 14 at the rear wall ends 28 will be collinear. Thus, and as desired, the axes X and creases 14 formed therealong will extend perpendicular to the rear wall ends 28 and straight across the rear stud wall 24 between the side stud walls 26. Accordingly, the spacer 10 facilitates cutting of the intermediate portion to a length D corresponding to the predetermined distance, as well as ensuring that the creases 14 extend in a straight line perpendicular the rear wall ends 28.

Referring now to FIGS. 3 and 3a, therein is shown a spacer 10' in accordance with a second embodiment of the invention. Spacer 10' is identical to spacer 10 in all respects except for connector member 34'. For spacer 10', connector member 34' is telescopically extendible and retractable. Specifically, connector member 34' includes an inner member 52 connected to one plate 32 that is slidably mounted in an outer member 54 connected to the other plate 32, the inner member 52 being telescopically slidably extendible outwardly and slidably retractable inwardly relative the outer member 54. Thus, the predetermined distance D between the notch guide walls 46, and thus the predetermined distance D for length of intermediate portion 20 is adjustable by extending and retracting connector member 34'. For example, from a fully retracted configuration 56, in which plate 32 connected to the inner member 52 abuts against the outer member 54, corresponding to predetermined distance D, the connector member 34', notably the inner member 52, may be extended to space the notch guide walls 46 apart up to a distance of D+N, where N is the maximum distance or length that the inner member 52 may be extended telescopically outwardly from the outer member 54. To facilitate cutting and ensure that the members 52, 54 do not move during cutting once the desired distance between D and D+N is set, a retaining means 58 may be deployed to immobilize the members 52, 54 relative one another. For example, and as shown, the retaining means could include a threaded pin 58 which may be extended into or retracted through the outer member 54 to engage in retaining apertures 60 in the inner member 52 to hold or immobilize the inner member 52 relative the outer member 54. Further, if desired, markings 62 may be placed on inner member to indicate the distance D through D+N.

In use, the spacer 10, 10' is placed within the stud 12 with the outermost plate ends 36 intermediate the stud ends 18, preferably with enough space between notch guide walls 46 and stud ends 18 to ensure adequate length of end portions 22. For spacer 10', the correct or desired distance between D and D+N is set by extending or retracting connector member 34', typically prior to insertion into the stud 12. Next, the blades 50 of the metal snip 16 are aligned against one of the notch guide walls 46 and side stud wall 26 and flange 30 are cut through down to the rear stud wall 24 with the side of the blade 50 abutting alongside the guide wall. This cutting process is then repeated for the opposing notch 44 in the pair, i.e. the notch directly across from the notch 44 on the side stud wall 26 and flange 30 that was just cut, to form the axis X for the first crease 14. The cutting is then effected for the pair of notches 44 at the desired distance D through D+N to form the second axis X for second crease 14. The stud 12 can then be folded at the axes X to form the creases 14 and the intermediate portion 20 of length D to D+N.

Obviously, a single guide cutting tool 31 could be used, on its own, to effect the two pairs of creases 14 along a stud 12.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A spacer for use in cutting a metal stud to form first and second creases for defining an intermediate portion of predetermined length between the creases and bendable end portions extending from the creases to first and second longitudinal stud ends of the stud and bendable along the creases for attachment of the metal stud on end portions to supporting structures at desired angles, the metal stud having, extending from the first to second stud end, a rear stud wall, first and second side stud walls connected longitudinally to the rear stud wall at opposed lateral rear wall ends and extending substantially perpendicularly to the rear stud wall, and stud flanges extending substantially perpendicularly inwardly from each side stud wall towards one another, the spacer comprising:
- first and second plates, each said plate having first and second longitudinal plate ends and generally opposed plate sides extending longitudinally between the plates ends, the plates being sized and shaped for sliding insertion into the stud with the plates resting on the bottom wall and the plate sides resting snugly against the first and second side stud walls, each plate side having notches formed therein with each notch having a straight notch guide wall extending inwardly at a generally perpendicular orientation from the plate side and a slanted remaining notch wall extending inwardly from the plate side towards the notch guide wall, the notch guide walls of each plate side being colinearly aligned and the slanted notch walls extending inwardly towards opposite plate ends of the plate;
- a connector member connecting the plates with the first and second side stud walls of each plate in collinear alignment with one another and the straight notch walls of the first plate spaced apart at the predetermined length from the straight notch walls of the second plate, the notch guide walls bracing a blade of a cutting implement in abutment along the guide wall during cutting through the first and second side stud walls and the flanges down to the rear stud wall with implement to form the creases, the collinear alignment of the notch guide walls and the perpendicular orientation of the guide walls ensuring that the creases extend perpendicular the lateral rear wall ends and the predetermined length between the notch guide walls ensuring that the creases are spaced apart at the predetermined length and that the intermediate portion is of the predetermined length.

2. The spacer of claim 1, wherein the connector member is adjustable in length so as to adjust the predetermined length between the notch guide walls.

3. The spacer of claim 1, wherein the connector member includes an inner member connected to the first plate and an outer member connected to the second plate, the inner member being telescopically slidably extendible outwardly and slidably retractable inwardly relative the outer member.

4. The spacer of claim 3, wherein the connector member includes a retaining means mounted thereon, the retaining means being selectively deployable to immobilize the inner and outer members relative to one another.

5. The spacer of claim 4, wherein the retaining means include a threaded pin extending into or retracted through the outer member, the threaded pin selectively engaging in retaining apertures extending into the inner member.

* * * * *